US010751633B2

(12) United States Patent
Goodrich et al.

(10) Patent No.: US 10,751,633 B2
(45) Date of Patent: Aug. 25, 2020

(54) EGG-LIKE DUAL SUBSTANCE PACKAGE, AND METHOD OF MAKING A TOY FIGURE

(71) Applicant: MGA Entertainment, Inc., Van Nuys, CA (US)

(72) Inventors: Marc Goodrich, North Hollywood, CA (US); Lea Saito, Hawthorne, CA (US); Philip Ho, South Pasadena, CA (US); Amandine Consorti, Los Angeles, CA (US)

(73) Assignee: MGA Entertainment, Inc., Chatsworth, CA (US)

( * ) Notice: Subject to any disclaimer, the term of this patent is extended or adjusted under 35 U.S.C. 154(b) by 268 days.

(21) Appl. No.: 15/887,885

(22) Filed: Feb. 2, 2018

(65) Prior Publication Data

US 2018/0221780 A1   Aug. 9, 2018

Related U.S. Application Data

(60) Provisional application No. 62/454,698, filed on Feb. 3, 2017.

(51) Int. Cl.
*A63H 9/00* (2006.01)
*B29C 44/40* (2006.01)
(Continued)

(52) U.S. Cl.
CPC ............... *A63H 9/00* (2013.01); *A63H 3/16* (2013.01); *A63H 3/50* (2013.01); *A63H 33/001* (2013.01);
(Continued)

(58) Field of Classification Search
CPC .......... B29C 2033/0005; B29C 44/183; B29C 55/20; B29C 44/40; B29C 39/24;
(Continued)

(56) References Cited

U.S. PATENT DOCUMENTS 3,866,350 A * 2/1975 Goldfarb .................. A63H 3/46
446/383
4,232,788 A * 11/1980 Roth ..................... B65D 81/113
206/524

(Continued)

OTHER PUBLICATIONS

Industrial Polymers Corporation, Youtube video demonstrating A+B molding foams, https://www.youtube.com/watch?v-RQbfGSttIFU, posted Aug. 31, 2010, still shot from video.

(Continued)

*Primary Examiner* — Leith S Shafi
(74) *Attorney, Agent, or Firm* — Intellectual Property Law Offices of Joel Voetzke, APC (57) ABSTRACT

A toy includes an overall package that holds an A+B molding foam. The overall package includes both a transparent or translucent outer package that contains a first or A part of the molding foam, and an inner transparent or translucent package that contains a second or B part of the molding foam. The A and B parts having contrasting colors. The overall package therefore resembles an egg. The user manually bursts the inner package and mixes the two substances together within the outer package, then pours the resultant molding foam into a mold to create a toy figure. The egg-like package enhances the child's play experience of giving birth to or hatching the toy figure.

15 Claims, 7 Drawing Sheets

(51) Int. Cl.
*A63H 3/50* (2006.01)
*B29C 39/26* (2006.01)
*A63H 3/16* (2006.01)
*A63H 33/00* (2006.01)
*B29C 39/24* (2006.01)
*B29K 75/00* (2006.01)

(52) U.S. Cl.
CPC .............. *B29C 39/24* (2013.01); *B29C 39/26* (2013.01); *B29C 44/40* (2013.01); *B29K 2075/00* (2013.01)

(58) Field of Classification Search
CPC ........ B29C 39/26; A63H 9/00; A63H 33/001; A63H 3/50; A63H 3/16; B29K 2075/00
USPC ........................................................ 206/524
See application file for complete search history.

(56) References Cited

U.S. PATENT DOCUMENTS

| | | | |
|---|---|---|---|
| 4,571,209 A | | 2/1986 | Manning et al. |
| 4,758,198 A | * | 7/1988 | Ishiwa ..................... A63H 3/06 137/512 |
| 5,480,339 A | * | 1/1996 | Wu .......................... A63H 3/06 446/220 |
| 5,497,829 A | | 3/1996 | Rajkovich |
| 5,597,593 A | | 1/1997 | Lebensfeld et al. |
| 5,699,902 A | * | 12/1997 | Sperry ................. B65D 81/051 206/219 |
| 5,843,486 A | * | 12/1998 | Kurosaki ............... B29C 45/37 425/174 |
| 5,858,262 A | | 1/1999 | Lebensfeld et al. |
| 5,899,325 A | * | 5/1999 | Bertram ................ B29C 44/183 206/219 |
| 6,250,985 B1 | | 6/2001 | Nicholson |
| 6,712,201 B1 | * | 3/2004 | Bertram ................ B29C 44/183 206/219 |
| 7,273,297 B2 | | 2/2007 | Cranor et al. |
| 2005/0029148 A1 | | 2/2005 | Rust |
| 2005/0181084 A1 | * | 8/2005 | Anders ................. B29C 44/184 425/4 R |

OTHER PUBLICATIONS

Wikipedia article regarding Creepy Crawlers molding toy made by various Companies most recently Jakks Pacific, admitted prior art, posted at https://en.wikipedia.org/wiki/Creepy_Crawlers.

Mattel corporation, Crayola Melt N Mold Factory product, admitted prior art, http://shop.crayola.com/toys-and-activities/toys/melt-n-mold-factory-7470600002.html.

* cited by examiner

EGG-LIKE DUAL SUBSTANCE PACKAGE, AND METHOD OF MAKING A TOY FIGURE

CROSS-REFERENCE TO RELATED APPLICATIONS

This application claims priority from U.S. Provisional Patent Application Ser. No. 62/454,698 filed Feb. 3, 2017.

BACKGROUND OF THE INVENTION

1. Field of the Invention

This invention relates to the field of toys. More particularly, this invention relates to the field of an egg-like dual substance package and method for making a molded toy figure.

2. Description of Related Art

Children enjoy building or otherwise creating toy figures. Substances, molds, kits, and/or methods for making toy figures are disclosed in, for example, the following U.S. Pat. No. 4,571,209 to Manning et al.; U.S. Pat. No. 5,597,593 to Lebensfeld et al.; and U.S. Pat. No. 5,858,262 to Lebensfeld et al.

SUMMARY OF THE INVENTION

The present invention is of a method, apparatus, and kit for making a toy figure or figures. In one aspect, the molding material comprises two substances which, when mixed together, hardens or partially hardens, with one of the two substances being package in an inner pouch or container, and the inner pouch being contained within an outer pouch or container that also contains the second substance.

In one embodiment the inner pouch is rounded and somewhat flattened, and the substance within the inner container is a bright color such as yellow, orange, red, green, blue, violet, or a color somewhere between those colors on a standard color wheel; and the outer pouch is rounded and somewhat flattened, and the substance within the outer pouch is a clear, clearish, white, or off-white color. The two pouches are transparent or translucent. The overall package therefore resembles an egg without the shell on it, with the inner package containing the yolk of the egg. The child or other user manually bursts the inner pouch, allowing the substances in the inner and outer packages to intermix within the outer package. After the child manually bursts the inner package, she manually kneads the substances together within the outer package until there is no longer any color differentiation between the two substances, thus allowing the child to see that she has fully intermixed the two substances. The molding material should have sufficient working time to allow the child to fully mix the two substances and then pour the molding material from the outer package into the mold. Preferably the molding material provides at least three minutes of working time. Three minutes of working time can mean that the material provides least three minutes from the time that the material is intermixed until it expands by 10% or more, or until the time that it begins to noticeably harden.

Once the materials are intermixed to create the mixed molding material, which will be called a molding foam, the user opens the outer package such by removing a cap from a pour spout that is integrated with the outer package, and squeezes the mixed molding foam into a mold. The mold can take the form a figure such as a human or animal. The mixed molding material then expands and turns into a foam-like substance, filling the mold cavity and eventually hardening. Preferably, after the molding material has been poured into the mold, and the material has expanded, it hardens so that it is no longer tacky to the touch within a time span of 30 minutes or less, and preferably so that it has completely expanded and is no longer tacky to the touch within a time span of 20 minutes.

The mold may be transparent or otherwise clear and held within a molding machine that includes a timer and a viewing window. The child sets the timer, and the timer then makes an audible noise when the foam has sufficiently hardened for the child to remove the figure and begin playing with it. The child can watch through the window as the foam expands to fill the transparent mold.

In this way the child starts with an object that resembles an egg, and manipulates it to eventually give "birth" to a toy figure, or "hatch" the toy figure which may be in the form of a human, a humanoid, a realistic living creature such as an animal, or a fantasy creature. This play pattern enhances the play experience for the child in creating or building the toy figure.

The mold can include within it article before the molding foam is added. Such articles will be referred to as mold inserts. The mold inserts may be single-color or multi-colored plastic. The mold inserts make take the form of features of the toy figure such as a face, a hat, clothes, shoes, etc. A face will be used as an example. As the molding foam expands and hardens, it presses up against the face and adheres to it such that when the foam is hardened and the toy is removed from the mold, the toy already has a face on it. Alternatively, the face and other features may be formed as pieces that are pressed onto the figure after it has been molded, such as via posts formed with the features, and the posts fitting within corresponding holes in the figure.

A kit can contain the mold, a number of different mold inserts or press-on pieces, and a number of different packages containing the molding substances, for making a number of different toy figures.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

BRIEF DESCRIPTION OF THE DRAWINGS

FIGS. 2-11 are a series of progressive figures illustrating a first exemplary embodiment of the toy and molding kit of the present invention being used by a child, illustrating how the toy and kit are used to create a toy figure.

DETAILED DESCRIPTION OF THE PREFERRED EMBODIMENTS

Figure 1:
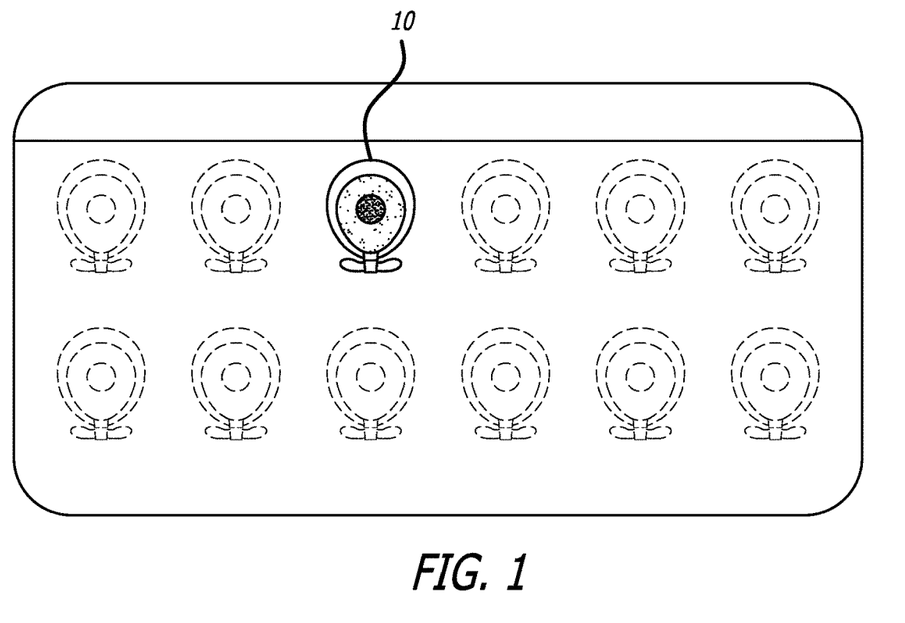
FIG. 1 is an illustration of a number of different toys according to the invention, with different toys having different colors, and defining different "eggs."

FIG. 1 is an illustration of a number of different toys 10 according to the invention, with different toys having different colors, and defining different "eggs." A number of such different toys could come as part of a single kit as purchased by the consumer.

Figure 2:
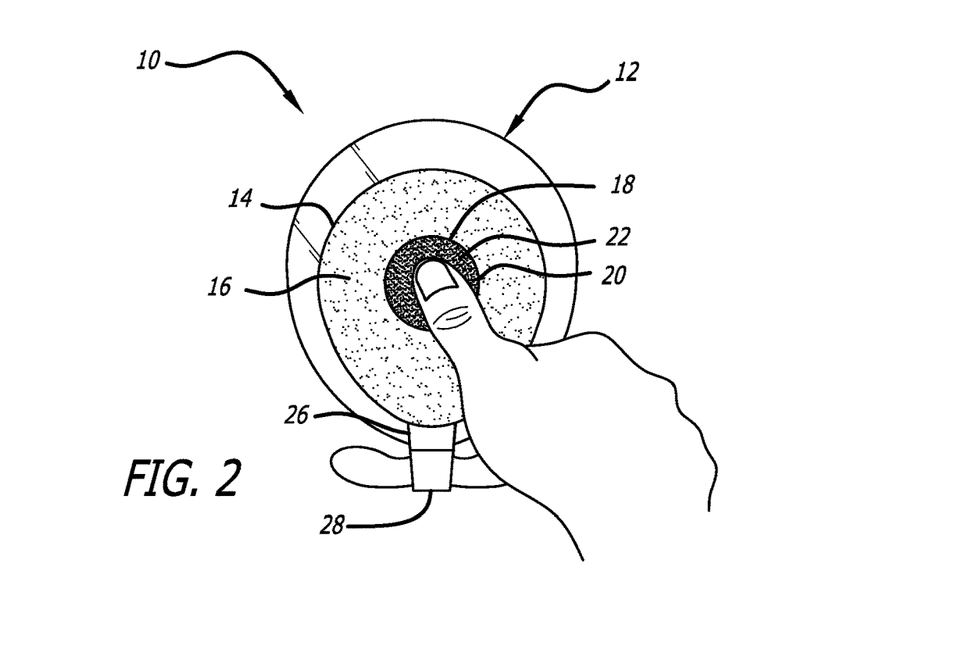
FIG. 2 is a top plan view of a first illustrative embodiment of an egg-like dual substance package according to a preferred embodiment of the invention.
Figure 3:
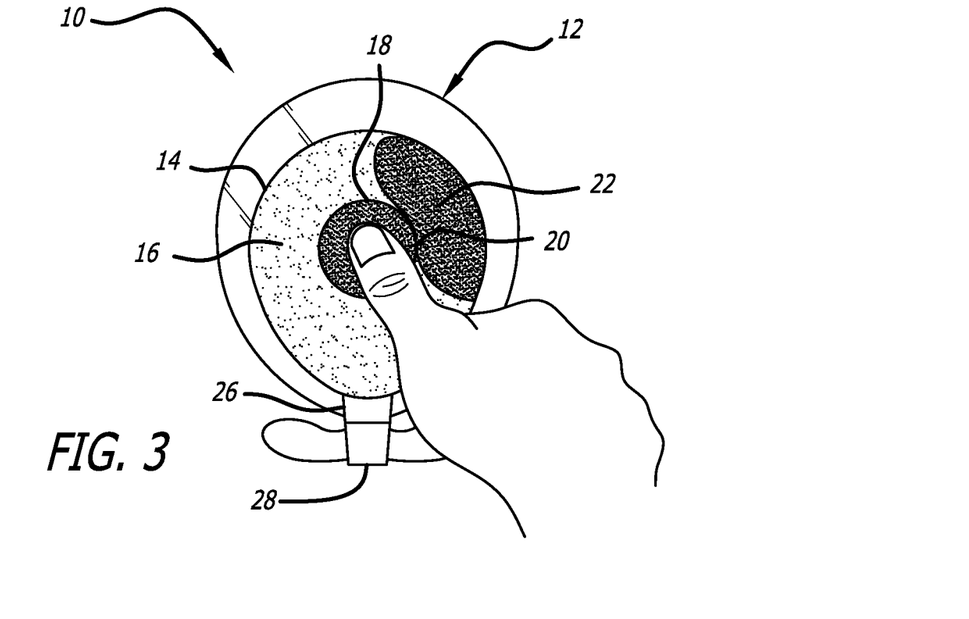
FIG. 3 is a top plan view of the dual-substance package of FIG. 2 showing the inner package having been ruptured by a user.

FIG. 2 is a top plan view of a first illustrative embodiment of an egg-like dual substance package according to a preferred embodiment of the invention. The toy 10 includes an overall package 12, the overall package including both an outer package 14 containing both a light-colored first substance 16 and an inner package 18 containing a more brightly colored second substance 22, such that the two colors define visually contrasting colors. Both the outer and inner packages 14, 18 are translucent or transparent, such as being made of clear plastic, rather than being opaque so that the child can see both packages including the substances inside them. The packages 14, 18 are both generally rounded at their peripheries and somewhat flattened, with the inner package 18 being positioned generally within the outer package 14. As can be seen in FIGS. 1-3, the first substance 16 in outer package 14 surrounds in two dimensions the second substance 22 in inner package 18. The overall toy 10 therefore has an egg-like appearance, with the inner package 18 containing the egg "yolk" and the outer package 14 containing the egg "white."

The toy 10 includes a pour spout 26 and a cap 28 that screws onto and off the pour spout. Pour spout 26 is in fluid communication with outer package 14.

The inner package 18 has at least one burstable wall 20 that is weak enough compared to walls that make up the outer package 14 that a child user can manually burst the inner package 18 such as by pressing on it with her thumb as shown in the figure. That is, the child can manually burst the burstable wall 20 that separates the two substances 16, 22 thereby allowing the two substances to intermix. At least one inner package wall 20 is therefore weaker than the outer package walls.

More generally, instead of the two substances 16, 22 being packaged in an inner container 18 and an outer container 14 that resembles an egg, the two substances could be packaged in a side-by-side or other spacial relationship, with a weaker, burstable wall 20 separating the two substances. The two substances would preferably still be of contrasting colors. In this embodiment the child would still burst the separating wall 20 allowing the substances to intermix, and could observe that the substances are sufficiently intermixed by seeing that the mixture has taken on a monochrome or single-color appearance.

FIG. 3 is a top plan view of the dual-substance package of FIG. 2 showing the inner package 18 having been ruptured by a user, and the brightly colored substance 22 therein being pressed out into the outer package 14. The first and second substances 16, 22 have now come into contact within outer package 14.

Figure 4:
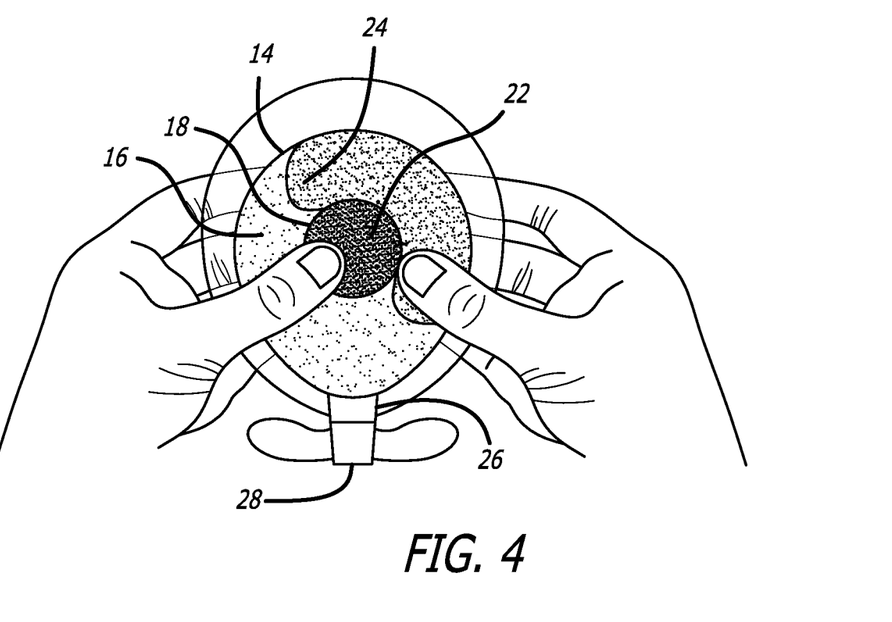
FIG. 4 shows the user kneading the outer package of the package of FIG. 2 thereby mixing the two substances together.

FIG. 4 is a top plan view of the dual-substance package of FIG. 2, showing the user kneading the outer package 14 and thereby mixing the two substances together. The user continues kneading the outer package until the two substances are thoroughly intermixed. The two intermixed substances may be referred to together as the molding compound 24. In the embodiment, the molding compound 24 includes two parts, which are sometimes are referred to as an "A" part or substance 16 and a "B" part or substance 22, with the combination referred to as an A+B molding foam or compound 24, or simply a A+B foam. The A+B molding foam 24 can be an A+B polyurethane molding foam. Such molding foams are, by themselves, known. For example, A+B polyurethane foams of different densities and rigidities are sold using the model numbers RF2-16×2 (2-lb density "polyurethane foam"), RF3-16×3 (3-lb density "rigid foam"), and SF3-25 (3½-lb "soft polyurethane foam") from Special Effects Supply Corporation located in North Salt Lake, Utah, and located on the Internet at www.fxsupply.com.

Once the intermixing is complete, the user removes cap 28 from pour spout 26. The mixture is now ready to pour into a mold through pour spout 26. Alternatively, instead of toy 10 having an integral pour spout 26 and cap 28 or other seal over the pour spout, the user could simply use a pair of scissors or the like to cut a small corner away from the toy and thereby create an opening, thus allowing the intermixed molding form 24 to be squeezed out through that opening.

Figure 5:
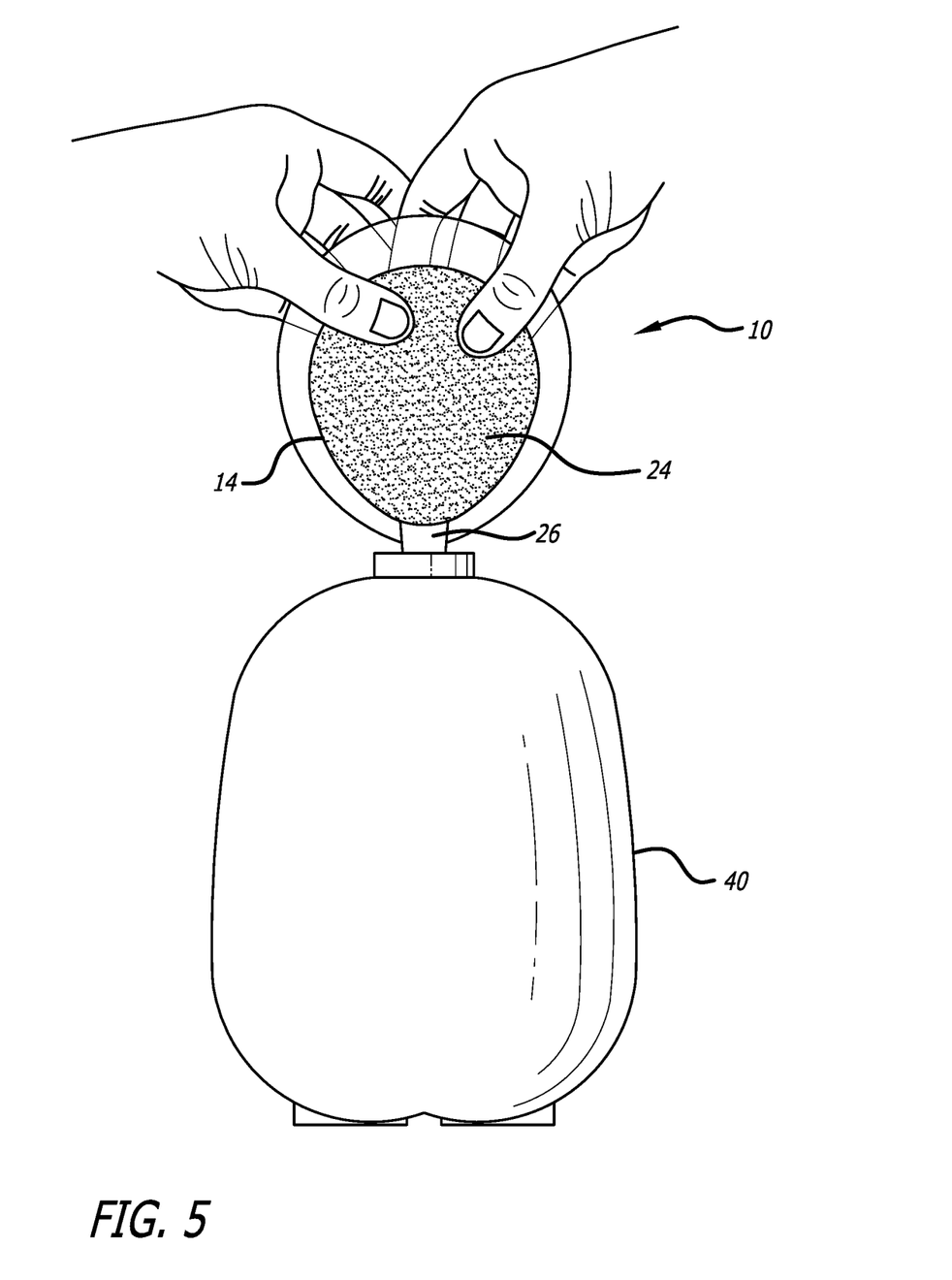
FIG. 5 illustrates the intermixed molding substance being squeezed from the outer package by a user into a molding machine.

FIG. 5 shows the intermixed substances defining molding foam 24 being squeezed from the outer package 14 through pour spout 26 and into a molding machine 40 by a user, and into a mold 30 within molding machine 40. Mold 30 within molding machine 40 is not seen in FIG. 5; it is perhaps seen most clearly in FIGS. 9 and 10.

Figure 6:
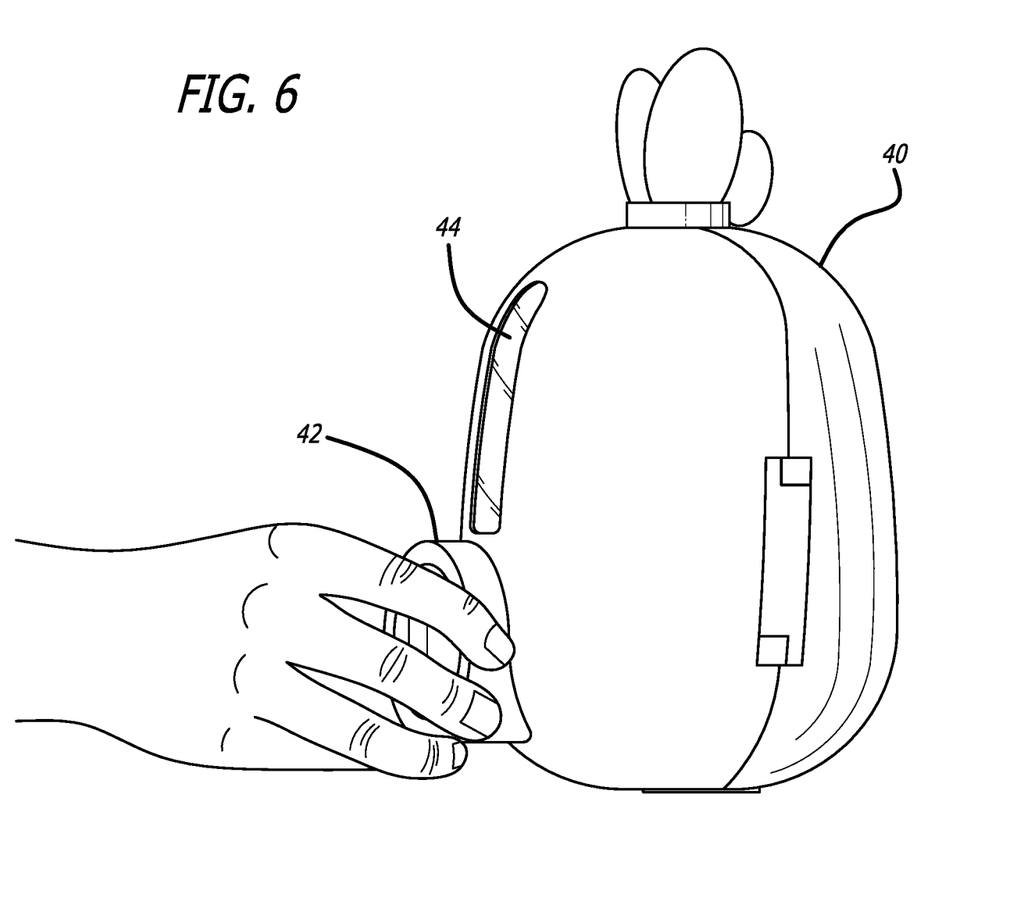
FIG. 6 illustrates a user setting a timer that is integrated into the molding machine.

FIG. 6 shows the user setting a timer 42 that is optionally integrated into the molding machine 40. Timer 42 tells the user when the expansion and hardening of the molding foam 24 is complete. In the figure, a clear viewing window 44 within molding machine 40 is slightly visible. The user can look through viewing window 44 and watch through the window as the foam 24 expands within mold 30, which itself is preferably clear so that the user can watch as molding foam 24 expands.

Figure 7:
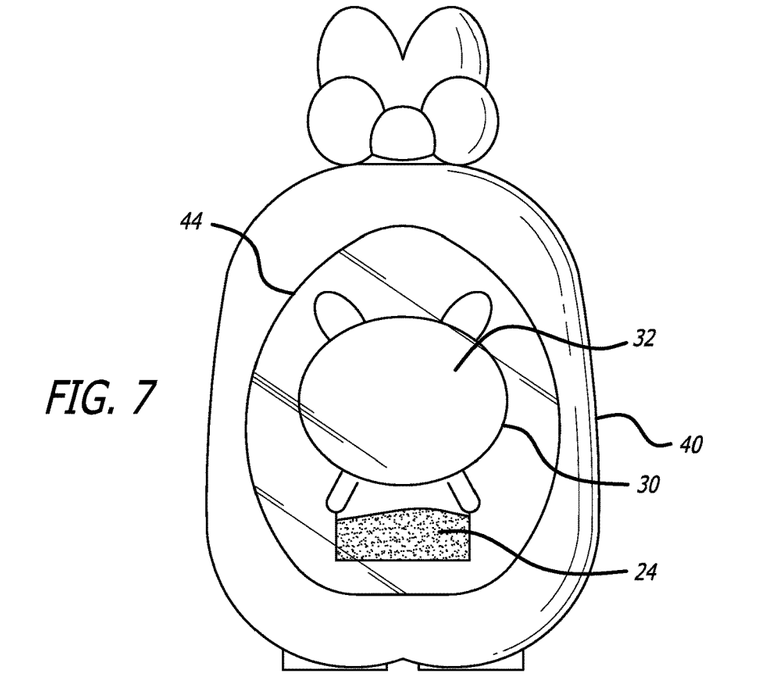
FIG. 7 is an illustration that shows the molding foam as it begins to expand into the mold.

FIG. 7 is an illustration that shows molding foam 24 as it begins to expand into mold cavity 32 within mold 30. A user can see the molding foam 24 expanding within mold 30 by looking through viewing window 44 that is provided within molding machine 40. Mold cavity 32 within mold 30 is in the shape of a fanciful animal having ears in this illustrative embodiment.

Figure 8:
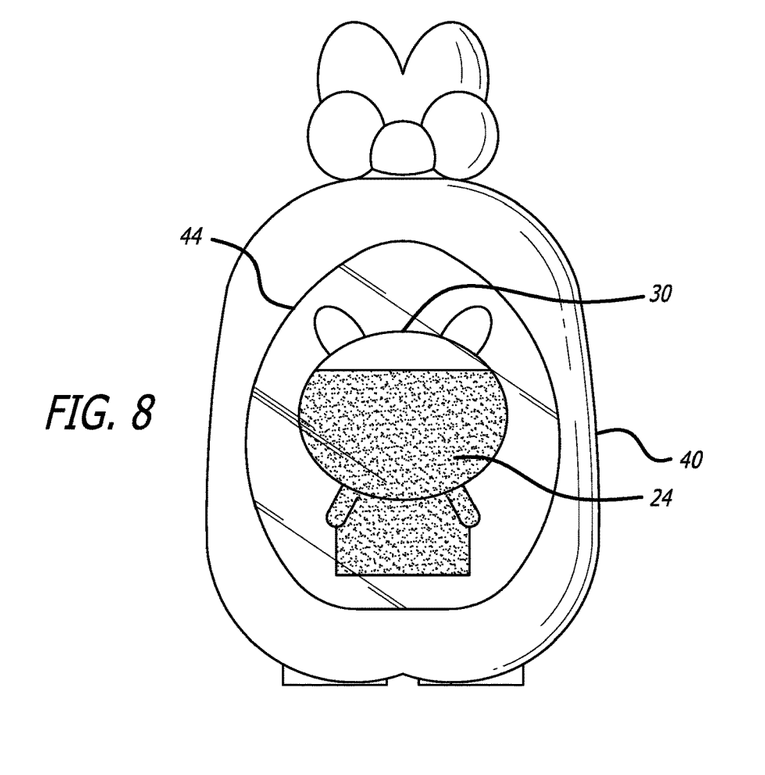
FIG. 8 shows molding foam 24 nearly completely expanded such that the mold is now nearly completely full.

FIG. 8 shows molding foam 24 nearly completely expanded. Mold cavity 32 within mold 30 is now nearly completely full.

Preferably the amount of A+B molding foam 24 in the overall package of toy 10 has the correct volume such that after the first and second substances 16, 22 are intermixed within the outer package 14 and A+B molding foam 24 is dispensed into mold 30, the A+B molding foam expands to substantially fill mold 30 without substantially overfilling mold 30. The term "substantially fill" can mean that the expanded foam 24 fills the mold cavity 32 to within 5% of the available internal volume of mold cavity 32 after any mold inserts have been accounted for. The term "without substantially overfilling the mold" can mean that the expanded foam 24 does not occupy a volume that is more than 5% greater than the available internal volume of mold cavity 32 after any mold inserts have been accounted for; it can mean that the expanded foam 24 does not expand so much beyond the volume of mold cavity 32 as to create a mess that requires substantial cleanup.

Figure 9:
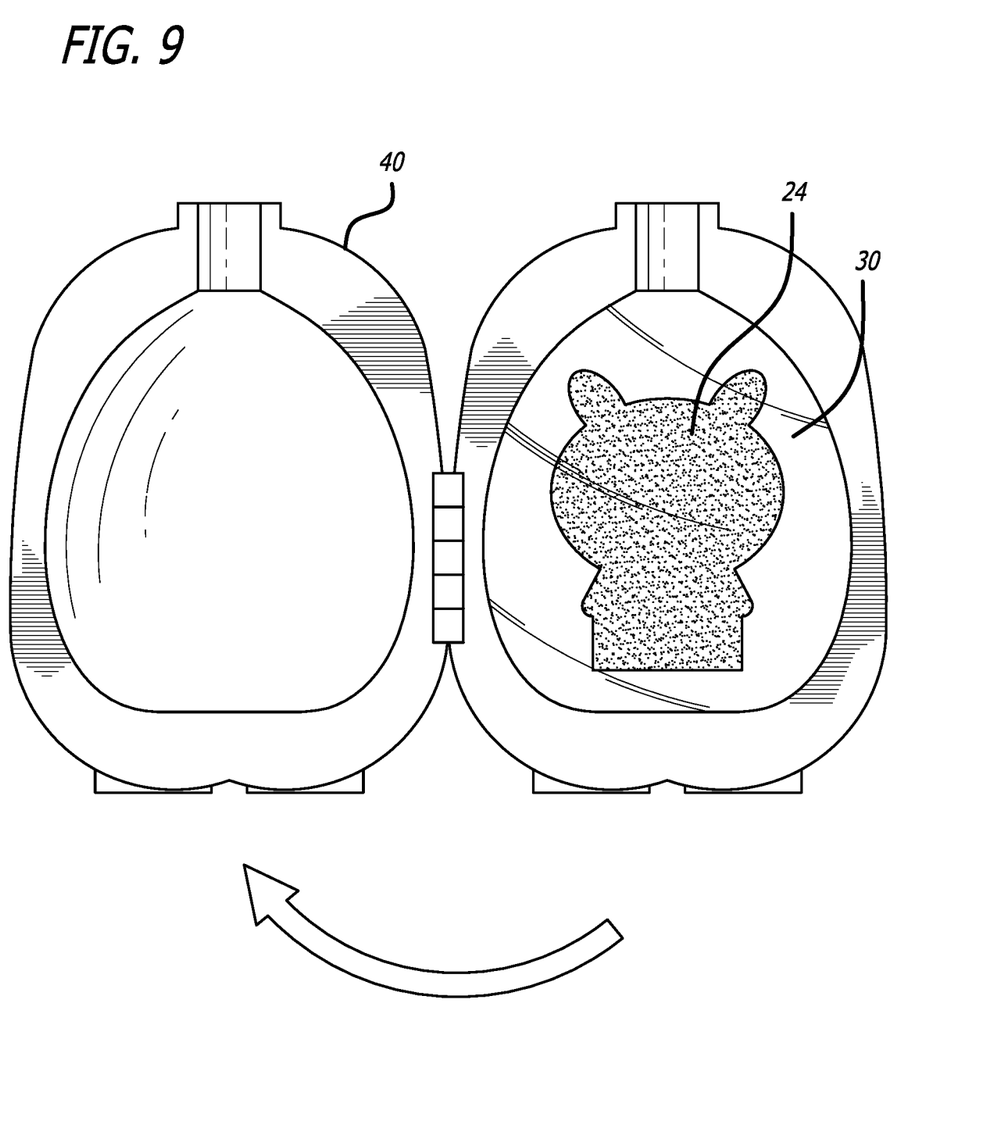
FIG. 9 shows the mold opened to reveal the fully expanded and hardened molding foam.

FIG. 9 shows mold 30 opened to reveal the mold cavity 32 which is now filled with the fully expanded and hardened foam 24. The two halves of mold 30 are hinged together so that the child can open the mold as shown.

Figures 10, 11:
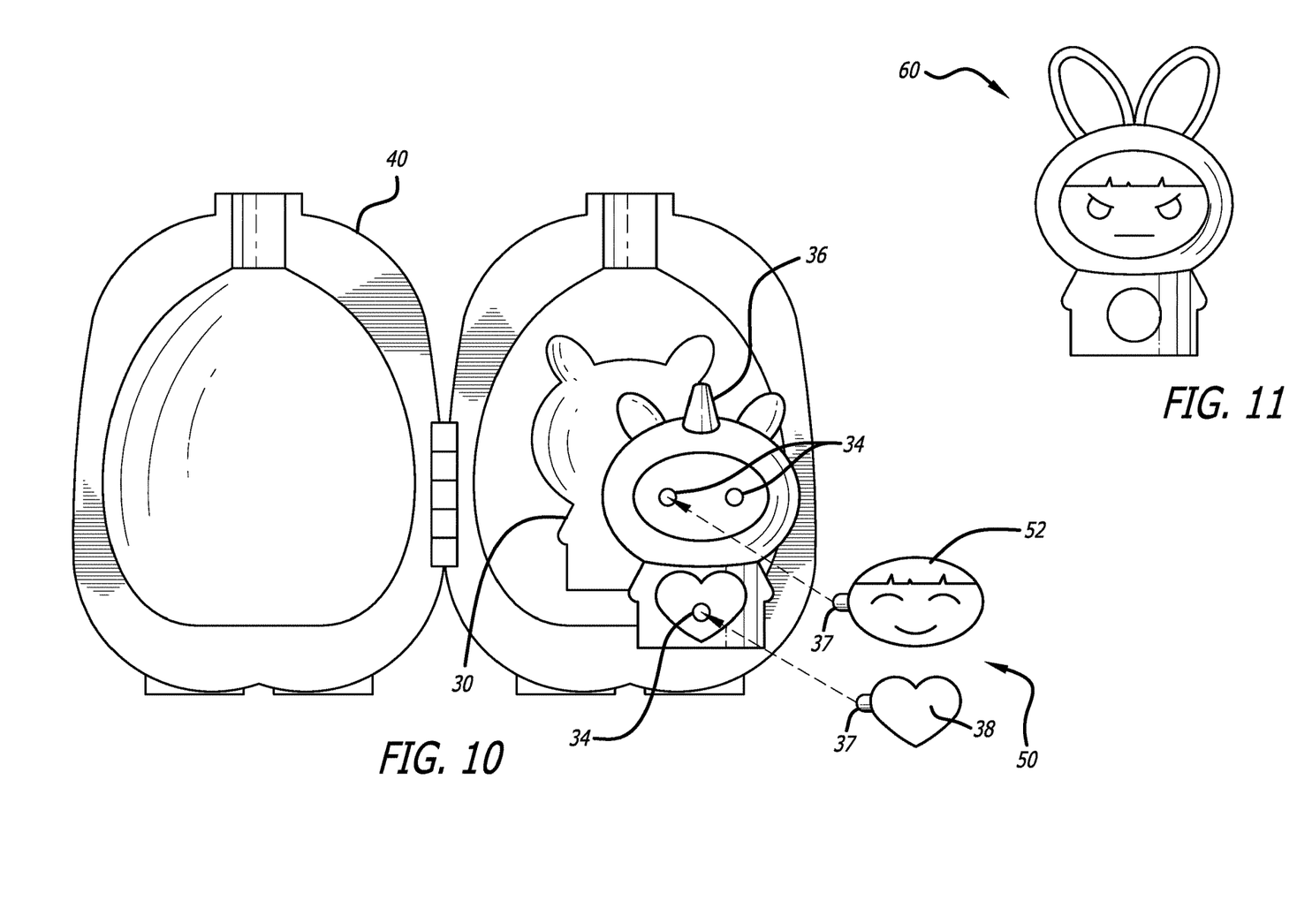
FIG. 10 shows the resulting toy figure being removed from the mold, which in turn is removed from the molding machine.
FIG. 11 shows a second and different toy figure that can be made using a second mold.

FIG. 10 shows the resulting toy FIG. 50 being removed from mold 30, which in turn is removed from molding machine 40. Press-on features 36, 38, 52 are then added. Each of the press-on features 36, 38, 52 have posts 37 that fit into corresponding holes 34 within the figure as molded. The press-fit of the posts 37 into the holes 34 cause the features to be firmly held onto FIG. 50. Press-on feature 52 is a multi-colored plastic piece that defines a face. Press-on feature 36 is a horn, and press-on feature 38 is an exterior decoration in the shape of a heart. The press-on features can be single-color or multi-colored press-on features having posts or similar retaining mechanisms.

Alternatively, the features could be mold inserts such as plastic inserts that are placed into mold cavity 32 before molding foam 24 is added. As molding foam 24 expands and hardens, it adheres to the mold insert 32. The result is that when the FIG. 50 is removed from the mold, FIG. 50 has a face or other features already integrated with the figure.

A kit purchased by the consumer can include a number of different press-on features or mold inserts defining a number of different faces and/or other features such as clothes, shoes, a hat, etc., different mold cavities, and different "eggs" of different colors, so that a child can make a number of different figures of different colors and having different faces. In this example, the resulting toy FIG. 50 is a "lovable unicorn" figure.

FIG. 11 shows a second and different toy FIG. 60 that can be made using the toy kit and a second mold. In this example, the resulting toy FIG. 60 is an "angry bunny" figure.

Alternatively, the press-on features could include a plastic plate having a face or other features on the front and small spike(s) on the back, with the spikes being pressed into the molded figure to affix the plate to the FIG. 50, without the spikes fitting into holes that are integrally molded with the figure.

Additionally, various other substances and/or items can be added to the mold, such as glitter, other surface ornamentation, or simulated hair such as strands of yarn. The mold can be provided with places such as their own cavities for receiving the strands of yarn and keeping them "dry," i.e., separated and untouched by the foam as the foam expands, with the ends of the hair extending into the "wet" part of the mold where the foam will fill, such that when the foam hardens the ends of the strands of yarn are embedded in the hardened foam.

It will be appreciated that the term "present invention" as used herein should not be construed to mean that only a single invention having a single essential element or group of elements is presented. Although the present invention has thus been described in detail with regard to the preferred embodiments and drawings thereof, it should be apparent to those skilled in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

We claim:

1. A toy molding kit comprising:
a transparent or translucent package having an outer wall and an inner wall, the inner wall separating the package into a first and outer compartment and a second and inner compartment;
a first substance of a first color in the first compartment;
a second substance of a second color in the second compartment, the second color visibly contrasting with the first color; and
a mold having the form of a toy figure;
wherein:
the first and second substances together define an A+B molding compound, the A+B molding compound hardening after the two substances have been intermixed; and
the inner wall of the package is weaker than the outer wall of the package and is manually burstable such that a user can manually burst the inner wall thereby allowing the first and second substances to be intermixed together within the package, then open the package and dispense the intermixed substances into the mold.

2. The toy molding kit of claim 1 wherein:
the mold is transparent; and
the A+B molding compound comprises an A+B molding foam.

3. The toy molding kit of claim 2 wherein:
the amount of A+B molding compound in the package has the correct volume such that after the first and second substances are intermixed within the package and the A+B molding foam is dispensed into the mold, the A+B molding foam expands to substantially fill the mold without substantially overfilling the mold.

4. The toy molding kit of claim 2 wherein when the A+B molding foam has fully expanded, its volume matches a volume of the mold to within 5%.

5. A toy molding kit comprising:
a transparent or translucent package having an outer wall and an inner wall, the inner wall separating the package into a first and outer compartment and a second and inner compartment, wherein:
the inner package is disposed within the outer package such that the first substance in the outer package surrounds in two dimensions the second substance in the inner package; and
the inner and outer packages are both generally rounded at their peripheries;
a first substance of a first color in the first compartment;
a second substance of a second color in the second compartment, the second color visibly contrasting with the first color; and
a mold having the form of a toy figure;
wherein:
the first and second substances together define an A+B molding compound, the A+B molding compound hardening after the two substances have been intermixed; and the inner wall of the package is weaker than the outer wall of the package and is manually burstable such that a user can manually burst the inner wall thereby allowing the first and second substances to be intermixed together within the package, then open the package and dispense the intermixed substances into the mold.

6. The toy molding toy of claim 5 wherein:
the first substance within the outer compartment has a color selected from the group consisting of clear, white, and off-white; and
the second substance within the inner compartment has a color selected from the group consisting of yellow, orange, red, green, blue, and violet.

7. The toy molding kit of claim 6 further comprising a press-on feature, the press-on feature defining at least one feature of the toy figure that results from the intermixed substances hardening within the mold, and having a post that fits into a hole integrally molded into the toy figure to hold the feature to the toy figure.

8. The toy molding kit of claim 1 wherein
the inner and outer packages are both generally rounded at their peripheries; and
the inner package is disposed within the outer package such that the first substance in the outer package surrounds in two dimensions the second substance in the inner package.

9. The toy molding kit of claim 1 wherein the package has an openable pour spout such that after a child has intermixed the two substances in the package, the child can use the pour spout to pour the intermixed substances into a mold.

10. The toy molding kit of claim 1 wherein the first substance within the outer compartment has a color selected from the group consisting of clear, white, and off-white.

11. The toy molding kit of claim 10 wherein the second substance within the inner compartment has a color selected from the group consisting of yellow, orange, red, green, blue, and violet.

12. The toy molding kit of claim 1 further comprising a molding machine that receives the mold, the molding machine having an integral timer that indicates via an audible signal that the intermixed substances have hardened.

13. The toy molding kit of claim 12 wherein the molding machine has a viewing window through which the user can watch the intermixed substances as they expand within the mold cavity.

14. The toy molding kit of claim 8 further comprising a press-on feature, the press-on feature defining at least one feature of the toy figure that results from the intermixed substances hardening within the mold, and having a post that fits into a hole integrally molded into the toy figure to hold the feature to the toy figure.

15. The toy molding kit of claim 14 wherein the press-on feature defines facial features.

\* \* \* \* \*